United States Patent [19]

Gaspardo

[11] Patent Number: 4,511,061
[45] Date of Patent: Apr. 16, 1985

[54] STIRRER-FEEDER FOR PNEUMATIC DISTRIBUTORS DRILLS

[76] Inventor: Luigi Gaspardo, Via Mussons 7, Morsano Al Tagliamento (PN), Italy

[21] Appl. No.: 488,262

[22] Filed: Apr. 25, 1983

[51] Int. Cl.³ .............................................. A01C 7/04
[52] U.S. Cl. .................................... 221/200; 221/211
[58] Field of Search .............. 221/200, 204, 211, 278; 418/168; 222/249, 352; 111/34, 36, 77

[56] References Cited

U.S. PATENT DOCUMENTS

| 2,510,658 | 6/1950 | Rassmann | 222/349 |
| 3,233,552 | 2/1966 | Kinnavy | 418/169 |
| 3,347,426 | 10/1967 | Morrison et al. | 222/352 |
| 4,148,414 | 4/1979 | Parks | 221/278 |

FOREIGN PATENT DOCUMENTS 2414287  8/1979  France ............................... 221/200

Primary Examiner—H. Grant Skaggs
Attorney, Agent, or Firm—McGlew and Tuttle

[57] ABSTRACT

A stirrer-feeder for pneumatic seed distributors includes a rotating body which is placed on the inside of a seed-holding tank and which is provided with flexible extensions that gliding next to holes provided on a distributor disk which is also in the tank. The extensions have the function of detaching from the holes knots of seeds that may have formed, in such a manner as to make only one seed engage in each hole.

5 Claims, 2 Drawing Figures

STIRRER-FEEDER FOR PNEUMATIC DISTRIBUTORS DRILLS

FIELD AND BACKGROUND OF THE INVENTION

The present invention provides for a stirrer-feeder for pneumatic seed distributors of the drill type, and which allow an easier functioning even when the seeds are very small, and which assure an even and well-timed sowing.

One of the most important problems concerning seeding (especially intensive cultivations, wherein all the available soil is exploited) is that of uniformly and evenly distributing seeds in the ground.

To this end, seeds should be sown at regular intervals, which is variable according to the kind of cultivation, so as to fill any gap and to avoid waste. In most cases, it is necessary to plant the seeds one by one, without leaving empty areas or planting more than one seed at a time.

To this end, drills are used which are equipped with pneumatic distributors comprising a couple of chambers set one close to the other, separated by a disk that rotates around its axis and is provided with a series of peripheral holes. Seed are put in one of said chambers, while the opposite chamber is kept at a lower pressure, so that seeds are sucked and kept pressed against the holes.

The shape of the chambers is such that this depression is maintained on the whole surface of the disk, except for a small lower area or zone through which seeds pass, falling then on the ground when the holes are in correspondence of said zone. To the rotary disk there are further applied fixed pins that extend towards the seed tank, and act as stirrers. Such devices, however, may present some inconveniences: in fact, very small seeds tend to get stuck in the disk holes, impeding thus the good functioning of the machine.

Moreover, in the quite frequent event where hairy seeds must be sewn, these tend to cling together and to fall in the ground not one by one but in knots, giving rise to the inconveniences.

SUMMARY OF THE INVENTION

With a view toward solving the above mentioned problem, the present invention provides for a stirrer-feeder for pneumatic distributors, which removes by mechanical means the seeds stuck in the holes and breaks up concurrently the knots that may form.

BRIEF DESCRIPTION OF THE DRAWINGS

The present invention will be now described in detail, with special reference to the accompanying drawings, wherein.

DESCRIPTION OF THE PREFERRED EMBODIMENT

Figure 1:
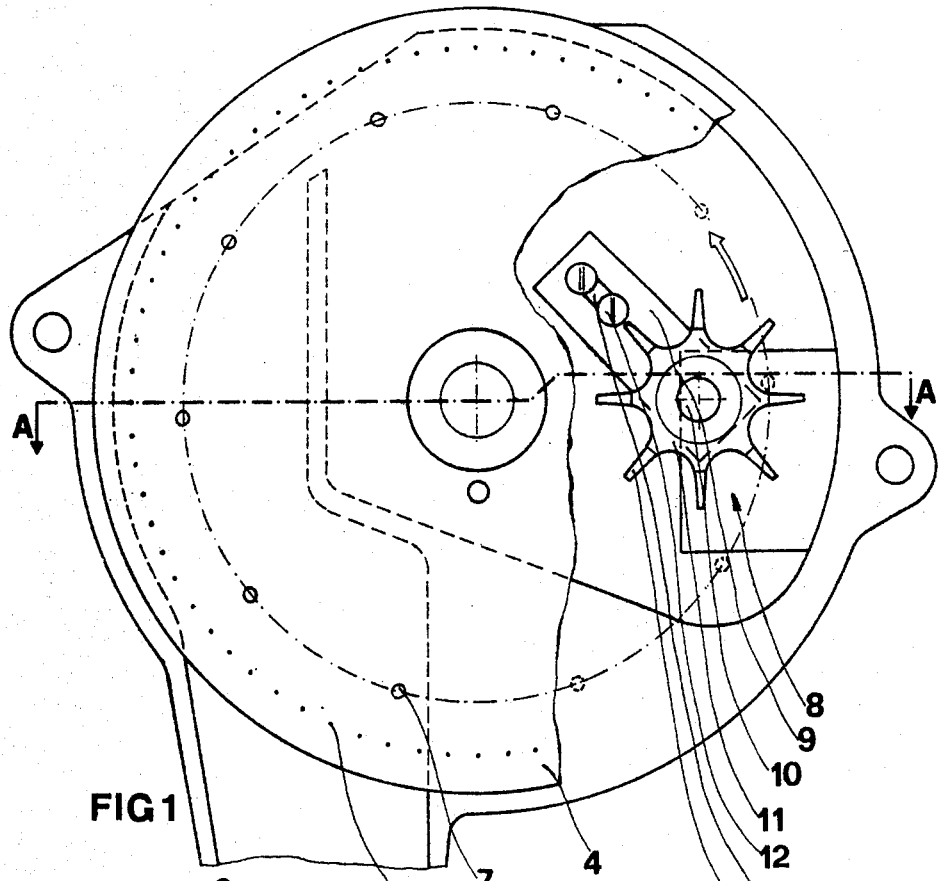
FIG. 1 is a partially sectioned view of a pneumatic distributor provided with a stirrer-feeder according to the invention.
Figure 2:
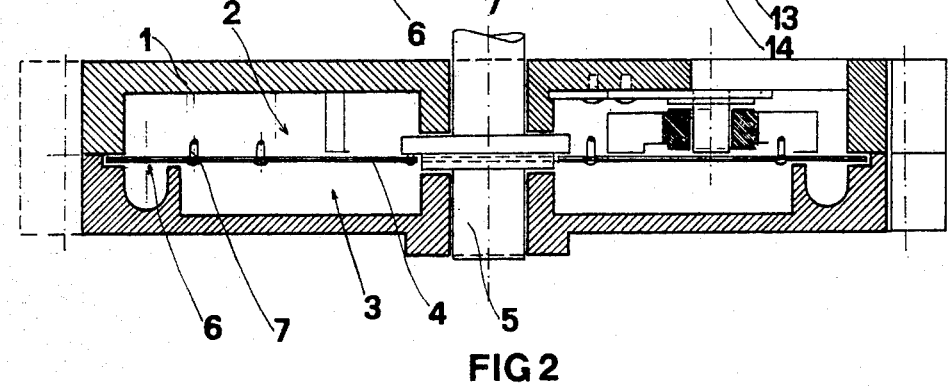
FIG. 2 is a sectional view taken along the line A—A of FIG. 1.

The pneumatic distributor provided with the device according to the present invention comprises a housing 1 divided into two circular chambers 2 and 3 by a disk 4 mounted on a shaft 5 which rotates about its own axis.

Disk 4 is provided with a series of peripheral holes 6, and carries a number of pins 7 or the like, extending inwards in chamber 2. Chamber 2 is connected to the seed containing tank of the drill, while chamber 3 is connected to suction apparatus of known kind, capable of keeping the inside of said chamber in a state of depressed pressure.

Inside chamber 2 there is a stirrer, indicated generally at 8, comprising a support element 9 to which there is secured a shaft 10 on which a star shaped element 11 is loosely mounted for rotation.

Element 9 is fastened to the container 1 by means of two screws 12 passing through a slit 13 present in said element.

The teeth or radial extensions 14 of the star shaped element 11 are made of flexible material, preferably soft rubber.

The device operates as follows:

From the tank of the drill (not shown), seeds are brought to chamber 2, in touch with the rotating disk 4. The suction caused by the depression provoked and maintained in the adjacent chamber 3 makes the seeds adhere to holes 6. The seeds fall then to the ground when the relevant hole passes before an area which is not affected by this pressure depression.

During the rotatory movement of disk 4, the fixed pins 7 engage the star shaped element 11 making it rotate around the fixed support 10. In the course of the rotation, the ends of flexible teeth 14 pass near the holes 6, removing thus the seeds that may have gotten stuck.

By effect of the rotation of element 11 on the inside of chamber 2, moreover, clusters of seeds—if any—are broken up.

Consequently, to each of holes 6 there adheres only one seed, which involves the advantage of a lesser depression gradient and of less chances for the seeds of getting stuck in the holes.

In connection with the above, there will be apparent the several advantages of the stirrer-feeder according to the invention, namely:

(a) breaking up of the seed clusters, and, consequently, increased chances that to each hole there correspond only one seed, as well as the possibility for the depression gradient at the other side of the disk of being reduced;

(b) as a consequence of the reduced pressure depression, less chances for the seeds of getting stuck in the holes, and less friction of the disk against the peripheral packings; and (c) removal, by means of flexible teeth 14, of the seeds—if any—stuck in the holes, each of which would otherwise obstruct the relevant hole preventing the passage of seeds during subsequent cycles.

Obviously the sizes as well as the employed materials may vary in accordance with the different requirements of use.

I claim:

1. A stirr-feeder for seeds, comprising:
   a housing (1) defining a space;
   a disc (4) rotatably mounted in said space and dividing said space into a seed chamber (2) on one side of said disc adapted to receive a supply of seeds, and a reduced pressure chamber (3) on an opposite side of said disc adapted to be subject to a reduced pressure, said disc having a plurality of holes (6) therethrough distributed around said disc near an outer periphery thereof;

a star-shaped body (8) rotatably mounted to said housing and disposed in said seed chamber for rotation in said seed chamber, said body having a plurality of radial flexible extensions, said body disposed in said seed chamber so that flexible extensions glide adjacent said holes as said holes pass said body with rotation of said disc; and drive means engaged with said star-shaped body for rotating said star-shaped body with rotation of said disc whereby seeds in said seed chamber are stirred by said radial flexible extension to cause no more than one seed to be engaged with each hole.

2. A stirrer-feeder according to claim 1, wherein said drive means comprise a plurality of pins fixed to said disc and distributed therearound, said pins extending into said seed chamber and positioned to engage said radial flexible extensions with rotation of said disc to rotate said star-shaped body.

3. A stirrer-feeder according to claim 2, including a shaft connected to said housing and extending into said seed chamber toward said disc, said star-shaped body rotatably mounted to said shaft for free rotation on said shaft.

4. A stirrer-feeder according to claim 3, wherein said radial flexible extensions are made of soft rubber.

5. A stirrer-feeder according to claim 4, including a further shaft rotatably mounted to said housing and extending through said space, said disc fixed to said further shaft, said further shaft being radially spaced from said first-mentioned shaft with respect to an axis of said further shaft.

* * * * *